United States Patent
Liu et al.

(10) Patent No.: US 9,156,238 B2
(45) Date of Patent: Oct. 13, 2015

(54) METHOD AND APPARATUS FOR THREE DIMENSIONAL LARGE AREA WELDING AND SEALING OF OPTICALLY TRANSPARENT MATERIALS

(71) Applicants: Jian Liu, Sunnyvale, CA (US); Huan Huang, Fremont, CA (US)

(72) Inventors: Jian Liu, Sunnyvale, CA (US); Huan Huang, Fremont, CA (US)

(73) Assignee: PolarOnyx, Inc., San Jose, CA (US)

(*) Notice: Subject to any disclaimer, the term of this patent is extended or adjusted under 35 U.S.C. 154(b) by 0 days.

(21) Appl. No.: 14/259,779

(22) Filed: Apr. 23, 2014

(65) Prior Publication Data
US 2014/0231021 A1 Aug. 21, 2014

Related U.S. Application Data

(62) Division of application No. 13/239,331, filed on Sep. 21, 2011, now Pat. No. 8,739,574.

(51) Int. Cl.
| | | |
|---|---|---|
| *H01S 3/10* | (2006.01) | |
| *B32B 37/06* | (2006.01) | |
| *C03B 23/203* | (2006.01) | |
| *C03C 27/06* | (2006.01) | |
| *B23K 26/06* | (2014.01) | |
| *B23K 26/32* | (2014.01) | |
| *B23K 26/20* | (2014.01) | |
| *B29C 65/16* | (2006.01) | |
| *B29C 65/82* | (2006.01) | |
| *B29C 65/00* | (2006.01) | |

(52) U.S. Cl.
CPC ............. *B32B 37/06* (2013.01); *B23K 26/0635* (2013.01); *B23K 26/206* (2013.01); *B23K 26/3266* (2013.01); *C03B 23/203* (2013.01); *C03C 27/06* (2013.01); *B29C 65/1606* (2013.01); *B29C 65/1609* (2013.01); *B29C 65/1616* (2013.01); *B29C 65/1638* (2013.01); *B29C 65/1654* (2013.01); *B29C 65/8253* (2013.01); *B29C 66/1122* (2013.01); *B29C 66/301* (2013.01); *B29C 66/43* (2013.01); *B29C 66/742* (2013.01); *B29C 66/7465* (2013.01); *B29C 66/74611* (2013.01); *B29C 66/81422* (2013.01); *B29C 66/81457* (2013.01); *B29C 66/836* (2013.01); *B29C 66/919* (2013.01); *B29C 66/91645* (2013.01); *B29C 66/934* (2013.01); *B29C 66/939* (2013.01)

(58) Field of Classification Search
CPC ......... H01S 3/005; H01S 3/101; H01S 3/117; H01S 5/0267; C03C 23/0025; C03C 32/02
See application file for complete search history.

(56) References Cited

U.S. PATENT DOCUMENTS

| | | | |
|---|---|---|---|
| 2010/0047587 A1* | 2/2010 | Itoh et al. .................. | 428/426 |
| 2010/0084384 A1* | 4/2010 | Bovatsek et al. ......... | 219/121.64 |
| 2011/0139760 A1* | 6/2011 | Shah et al. ............... | 219/121.83 |

*Primary Examiner* — Yuanda Zhang
(74) *Attorney, Agent, or Firm* — Taboada Law Firm, PLLC; John M. Taboada

(57) ABSTRACT

Methods and systems for three dimensional large area welding and sealing of optically transparent materials are disclosed, including generating a beam of ultra-short pulses from an ultra-short pulsed laser; directing the beam to an acoustic-optic modulator to control the repetition rate of the beam; directing the beam to an attenuator after passing through the acoustic-optic modulator to control the energy of the beam; directing the beam to a focusing lens after passing through the attenuator to focus the beam between a top substrate and a bottom substrate in order to weld the top substrate to the bottom substrate, wherein the top substrate and the bottom substrate are in intimate contact; and controlling the position of the top substrate and the bottom substrate relative to the beam using a three-axis stage in order to weld the top substrate to the bottom substrate at different points. Other embodiments are described and claimed.

9 Claims, 16 Drawing Sheets

METHOD AND APPARATUS FOR THREE DIMENSIONAL LARGE AREA WELDING AND SEALING OF OPTICALLY TRANSPARENT MATERIALS

I. CROSS REFERENCE TO RELATED APPLICATIONS

The application is a divisional application of application Ser. No. 13/239,331, filed Sep. 21, 2011, titled "Method and Apparatus for Three Dimensional Large Area Welding and Sealing of Optically Transparent Materials," the contents of which are hereby incorporated by reference.

II. BACKGROUND

The invention relates generally to the field of three dimensional large area welding and sealing of optically transparent materials. More particularly, the invention relates to welding and sealing with an ultra-short pulsed (USP) laser.

III. SUMMARY

In one respect, disclosed is an apparatus for sealing and welding optically transparent substrates comprising: an ultra-short pulse laser to produce a beam of ultra-short laser pulses, wherein the beam comprises a pulse duration, a wavelength, a repetition rate, and a pulse energy; an acoustic-optic-modulator at the output of the ultra-short pulse laser to control the repetition rate of the beam; an attenuator to control the energy of the beam after passing through the acoustic modulator; a focusing lens to focus the beam between a top substrate and a bottom substrate, wherein the top substrate and the bottom substrate are substantially in contact; and a three-axis stage to control the position of the top substrate and the bottom substrate relative to the beam.

In another respect, disclosed is a method for sealing and welding optically transparent substrates, the method comprising: generating a beam of ultra-short pulses from an ultra-short pulsed laser, wherein the beam comprises a pulse duration, a wavelength, a repetition rate, and a pulse energy; directing the beam to an acoustic-optic modulator to control the repetition rate of the beam; directing the beam to an attenuator after passing through the acoustic-optic modulator to control the energy of the beam; directing the beam to a focusing lens after passing through the attenuator to focus the beam between a top substrate and a bottom substrate in order to weld the top substrate to the bottom substrate, wherein the top substrate and the bottom substrate are substantially in contact; and controlling the position of the top substrate and the bottom substrate relative to the beam using a three-axis stage in order to weld the top substrate to the bottom substrate.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 3A:
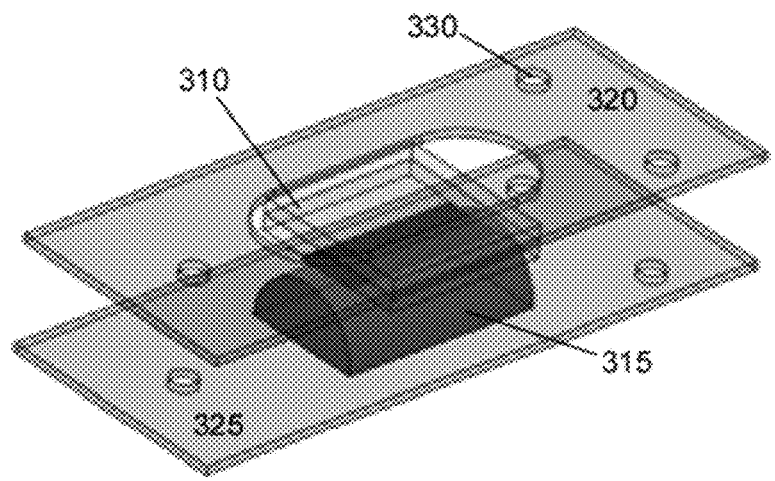

FIGS. 3(a) and (b) are a schematic illustrations showing an isotropic view and a cross sectional view, respectively, of a fixture for USP laser welding and sealing of optically transparent materials, in accordance with some embodiments.

Figure 4:
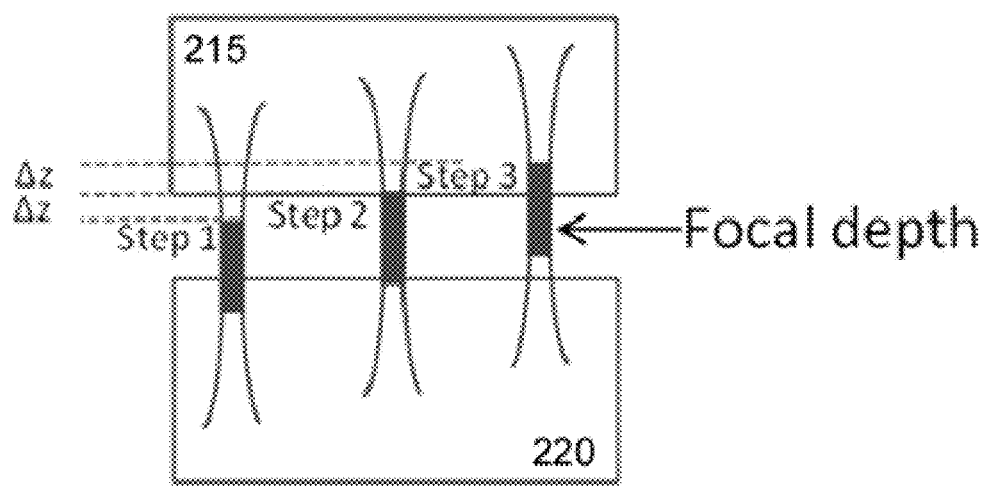

FIG. 4 is a schematic illustration of the focal position step adjustment for USP laser welding and sealing of optically transparent materials, in accordance with some embodiments.

Figure 5:
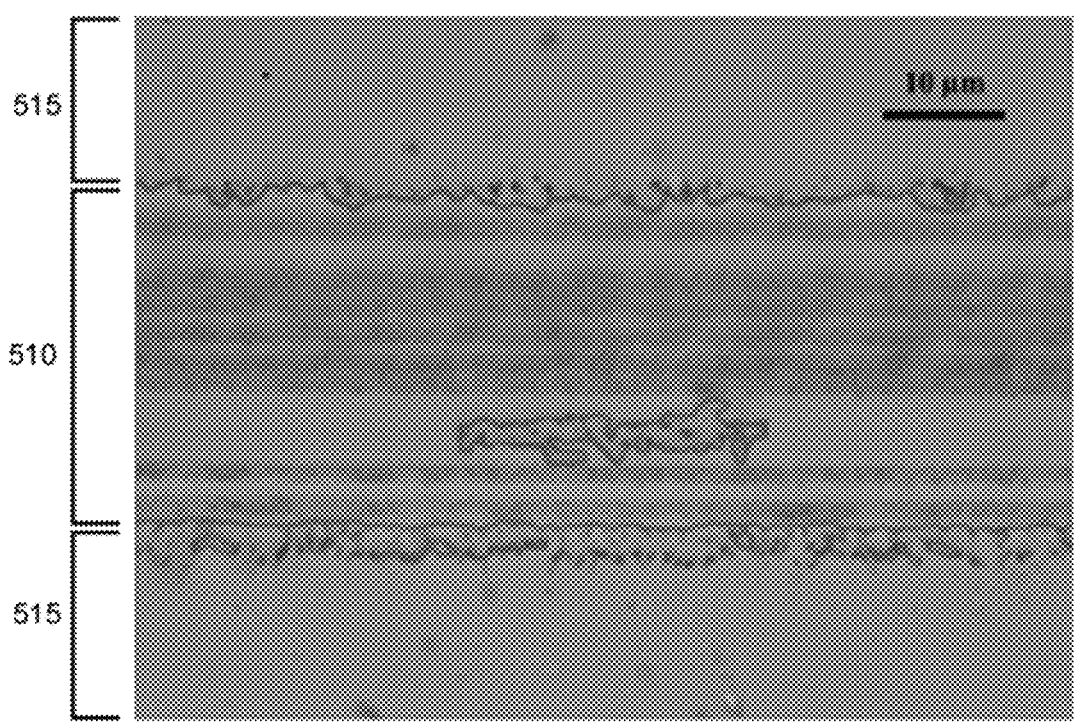

FIG. 5 is a microscopic view of welded and non-welded regions of fused silica, in accordance with some embodiments.

Figure 6A:
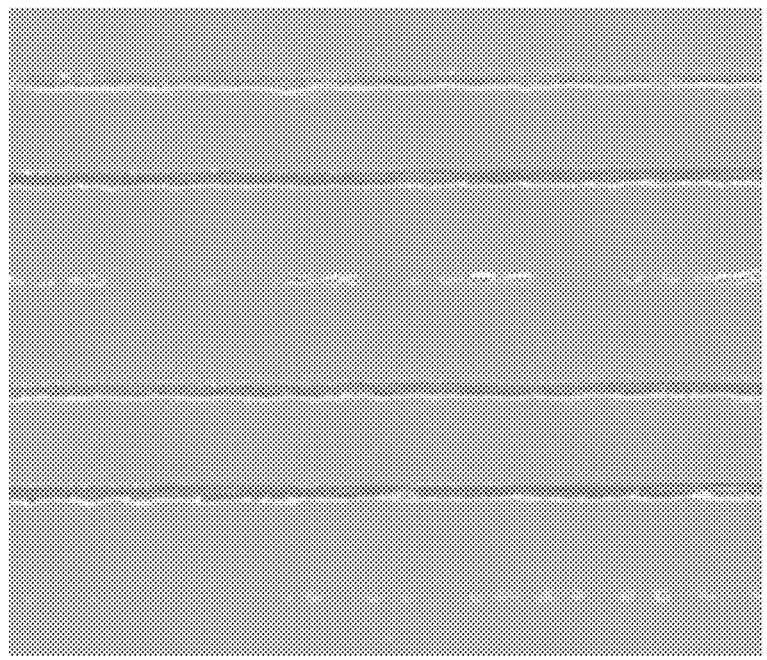
Figure 6B:
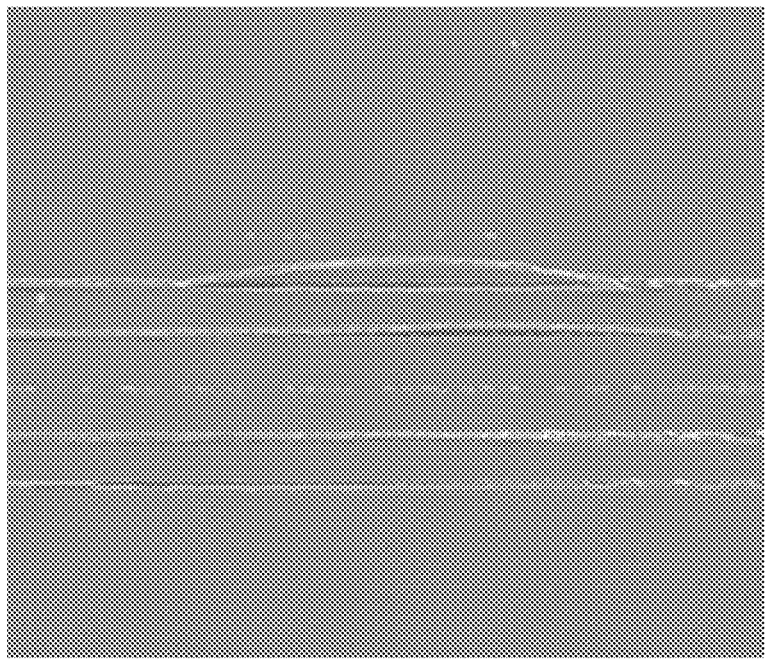

FIGS. 6(a) and (b) are SEMs of single line welds of fused silica with a 0.61 µJ laser pulse energy at a 1 mm/s scan speed after breaking the weld, where FIG. 6(a) shows the welding surface of the top substrate showing grooves or recesses where the welding seam has peeled off, and FIG. 6(b) shows the welding surface of the bottom substrate showing bumps or protrusions where the welding seam remains, in accordance with some embodiments.

Figure 7:
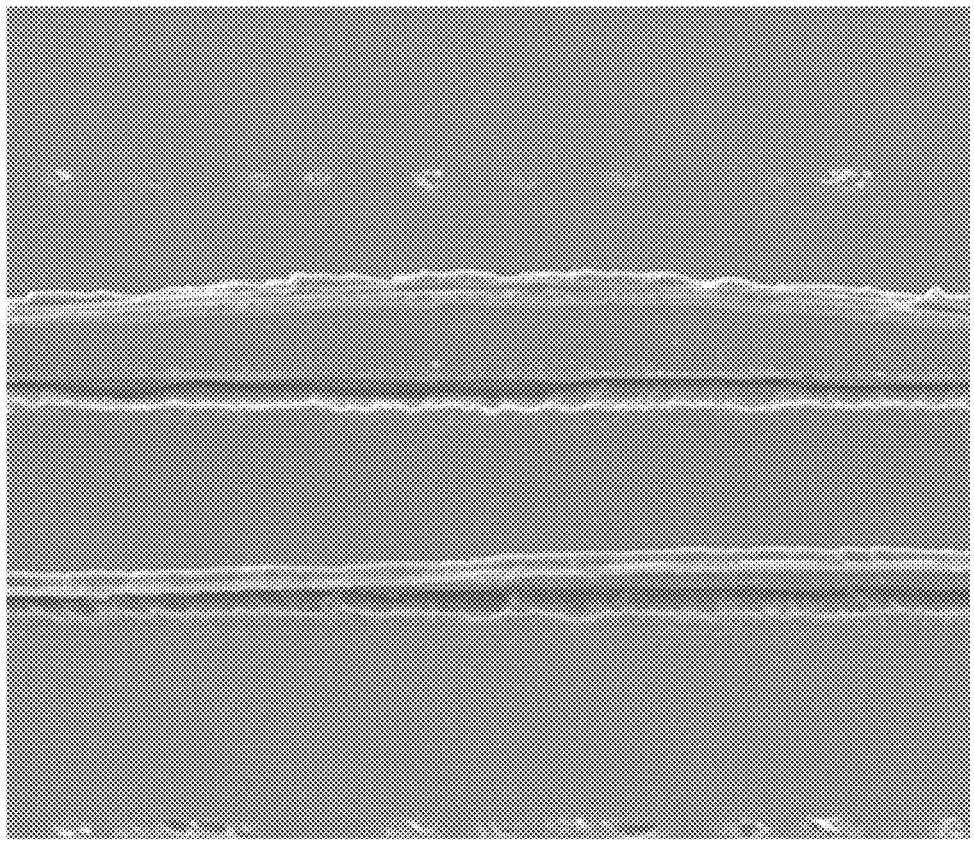

FIG. 7 is an SEM of single line welds of fused silica with a 0.61 µJ laser pulse at 1 mm/s with the weld seam floating in the air above the surface, in accordance with some embodiments.

Figure 8A:
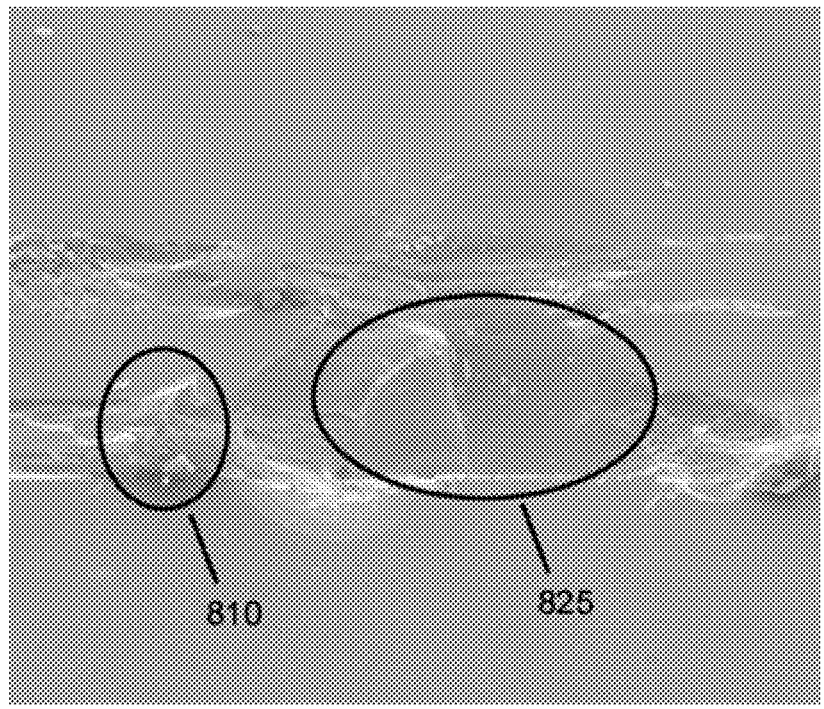
Figure 8B:
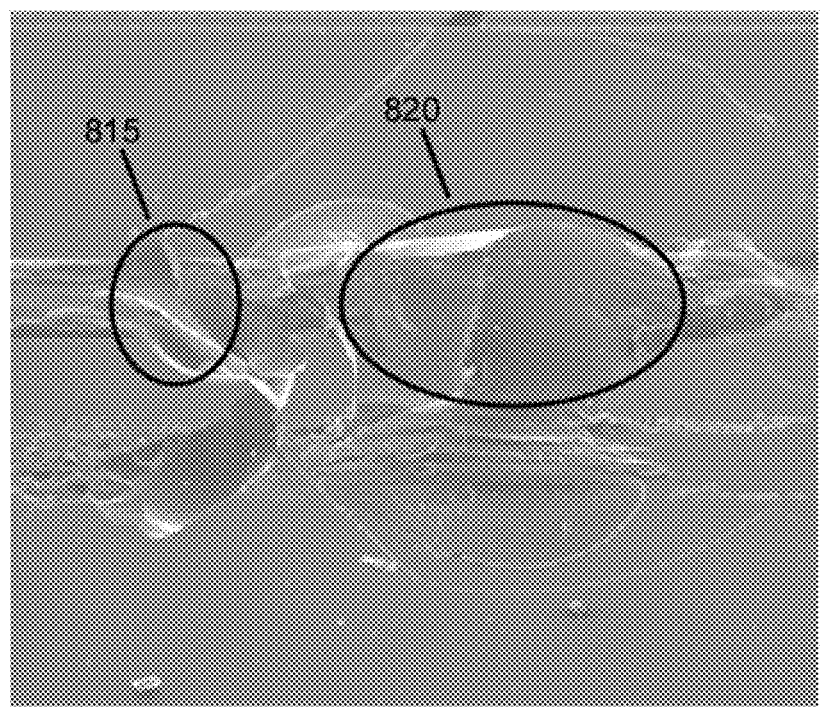

FIGS. 8(a) and (b) are SEMs of multi line weld regions of fused silica with a 0.61 µJ laser pulse at 1 mm/s after breaking the weld, where FIG. 8(a) shows the welding surface of the top substrate and FIG. 8(b) shows the welding surface of the bottom substrate, in accordance with some embodiments.

Figure 9:
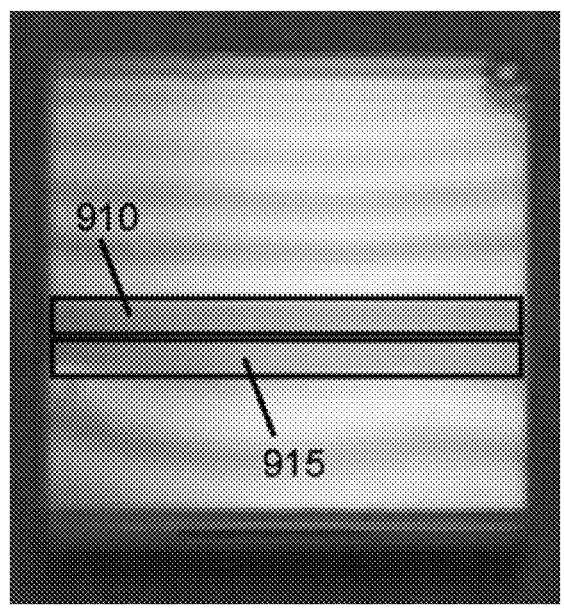

FIG. 9 shows two multi line weld regions in a sample, in accordance with some embodiments.

Figure 10A:
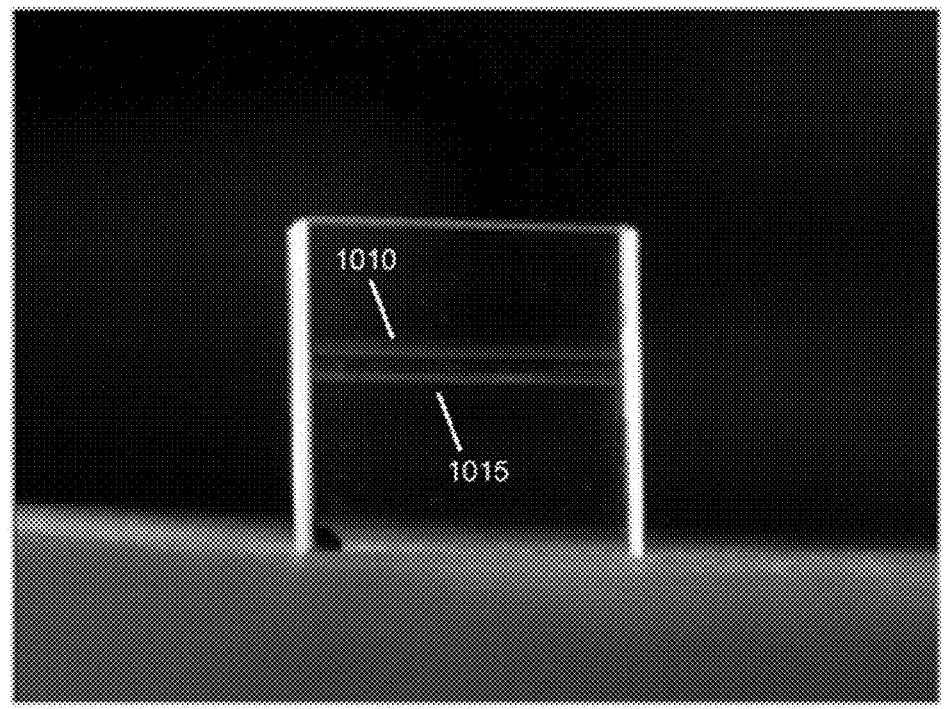
Figure 10B:
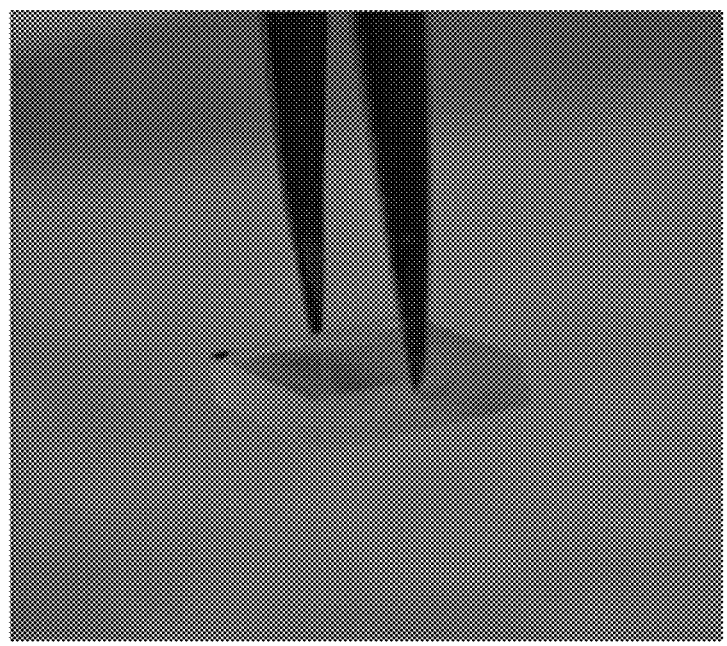

FIGS. 10(a) and (b) show a one-edge-sealed glass substrate weld, where FIG. 10(a) shows the welded regions visible by LED side illumination and FIG. 10(b) shows the attachment of the bottom plate as exhibited by the top plate being held by tweezers, in accordance with some embodiments.

Figure 11A:
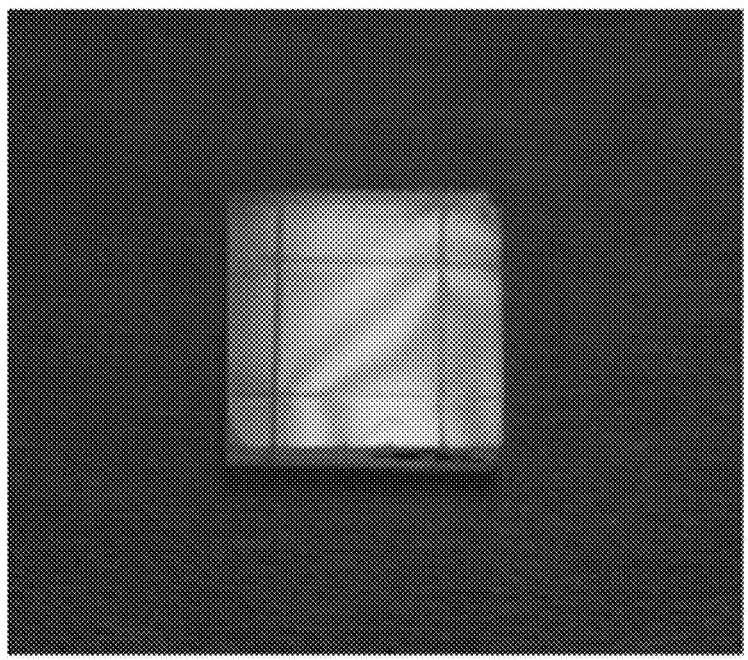
Figure 11B:
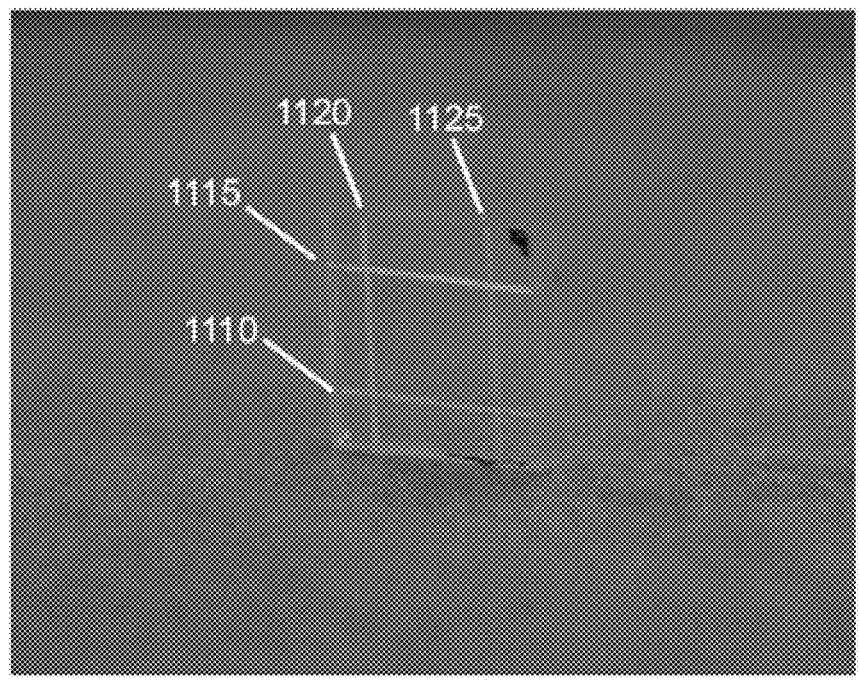

FIGS. 11(a) and (b) show a four-edge-sealed fused silica weld, where FIG. 11(a) shows the top view with interference fringes visible for those non-welded regions and no interference fringes visible for those sealed seams and FIG. 11(b) shows the four welded seams crossing each other visible by LED backlight illumination, in accordance with some embodiments.

Figure 12A:
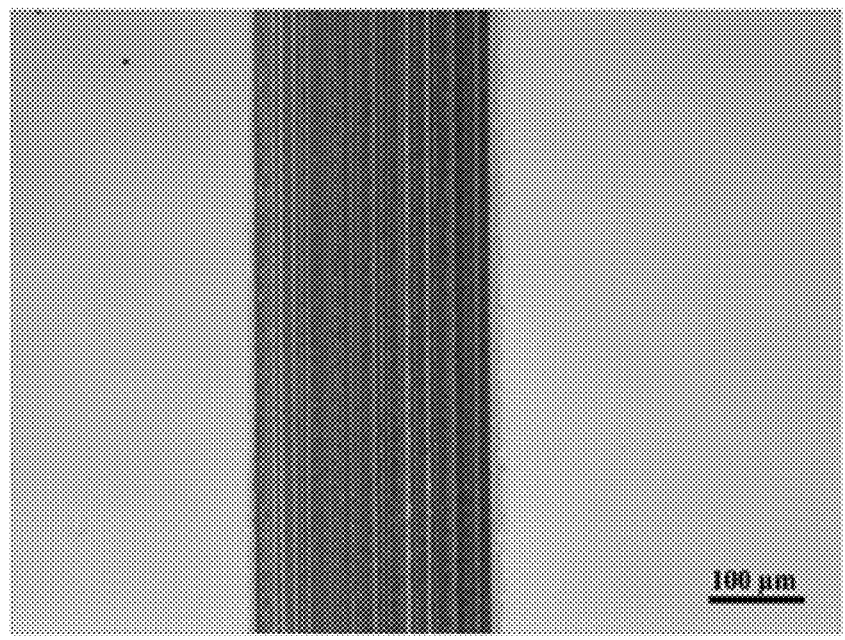
Figure 12B:
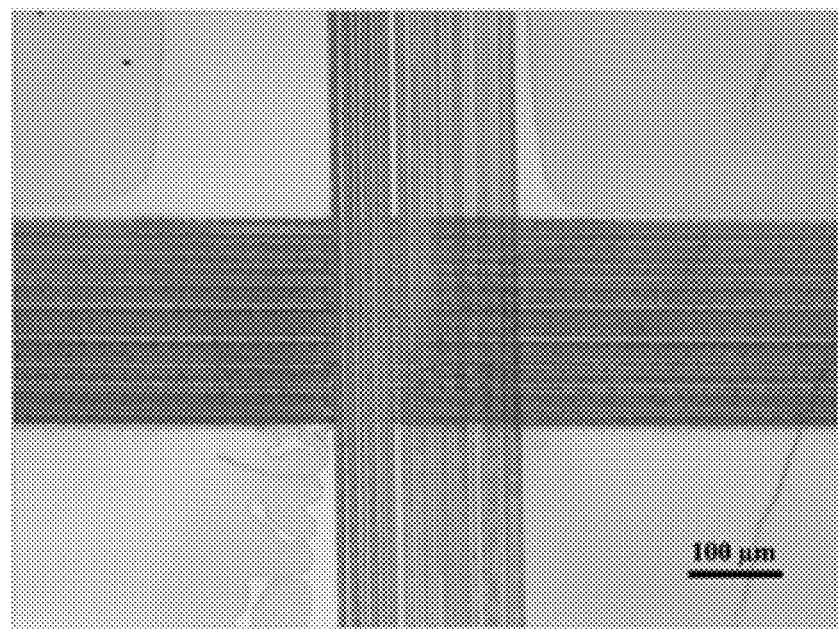

FIGS. 12(a) and (b) show microscopic views of four-edge sealing of two fused silica samples, where FIG. 12(a) shows the one of the seams composed of multiple welding lines and FIG. 12(b) shows the intersection of two seams, in accordance with some embodiments.

Figure 13:

FIG. 13 illustrates the hermetic sealing of the central region of the sample of FIGS. 11(a) and (b) after immersion in water, in accordance with some embodiments.

Figure 14:
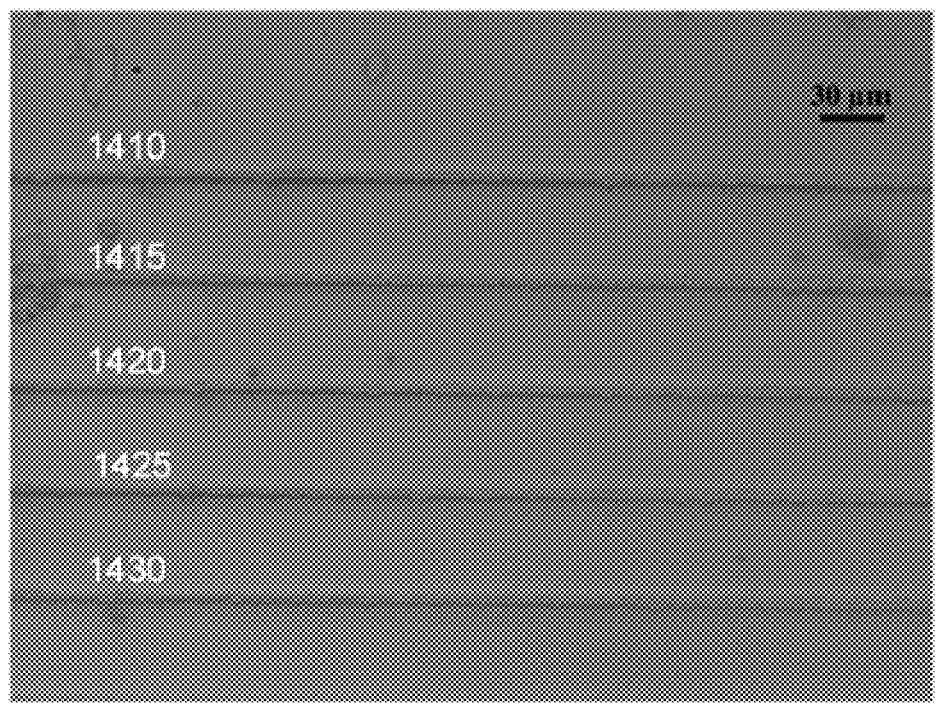

FIG. 14 shows a microscopic view of USP laser fused silica single line welds at different scanning speeds and the same pulse energy before separation, in accordance with some embodiments.

Figure 15:
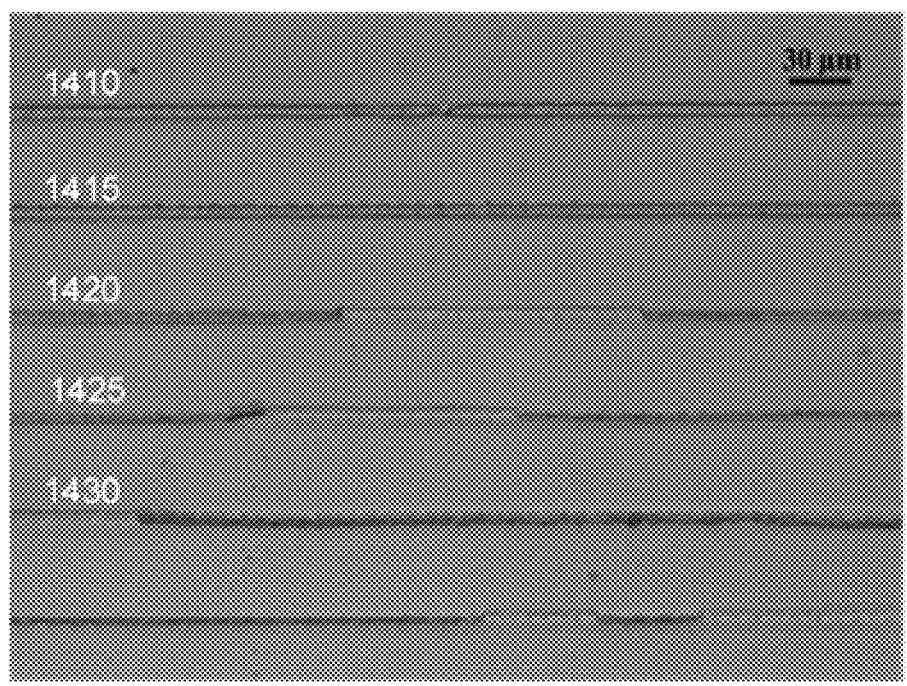

FIG. 15 shows a microscopic view of USP laser fused silica single line welds at different scanning speeds and the same pulse energy after separation, in accordance with some embodiments.

Figure 16:
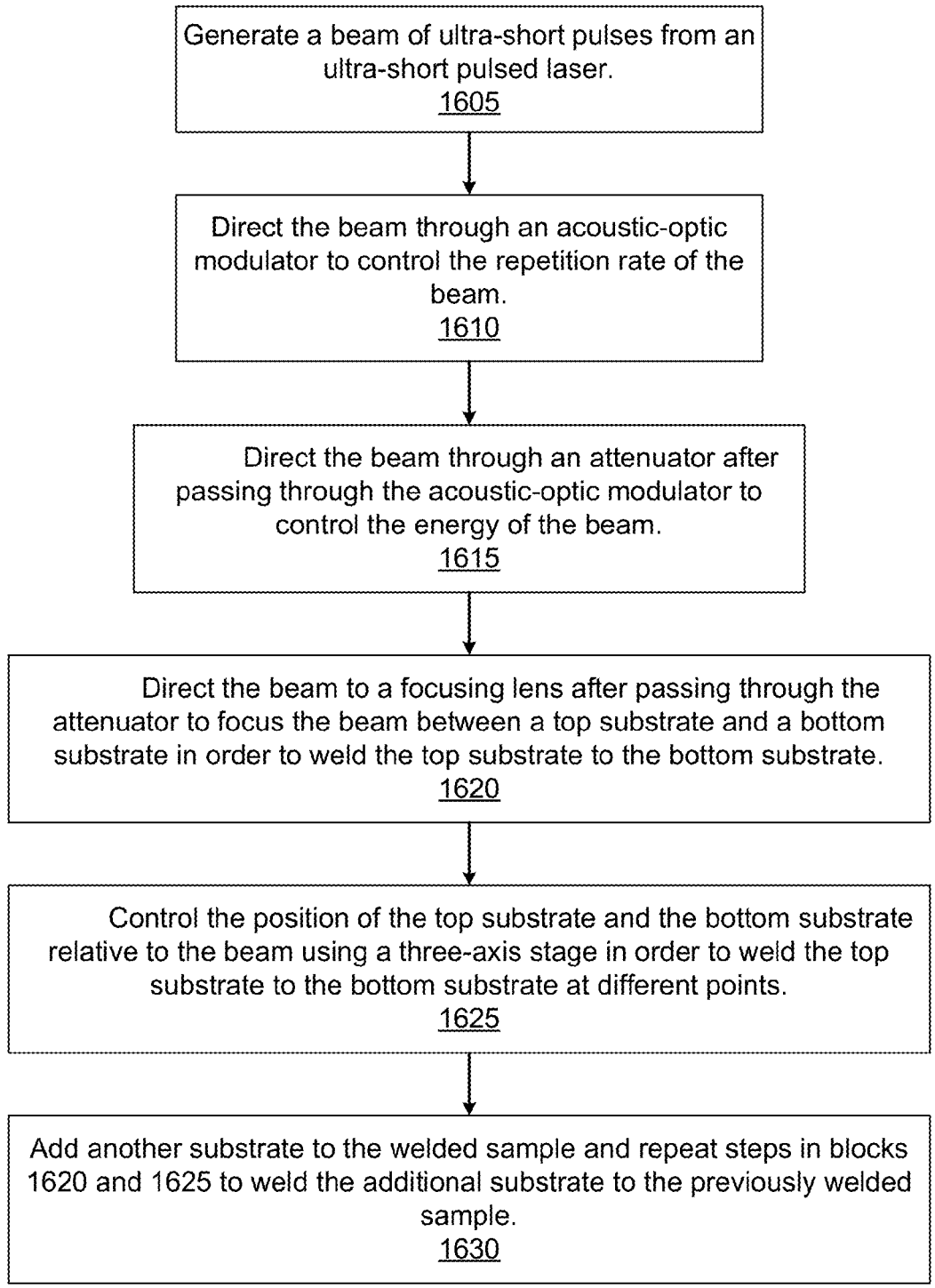

FIG. 16 is a block diagram illustrating a method for three dimensional large area welding and sealing of optically transparent materials with ultra-short pulsed laser, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Development of techniques for welding transparent materials is of great importance in a number of application areas, such as life science, sensing, optoelectronics, and MEMS packaging. The joining of two or more optically transparent materials, such as glasses, is useful and desired in device level fabrication, such as micro-fluidic systems where flexible, precise, strong, and tight sealing are required. The field lacks an effective method for transparent material welding with high flexibility, non-invasive, and single-step operation. Various joining and welding techniques have been developed and reported; however, each with specific properties has reached its limit in terms of flexibility, reproducibility, and preparation and cycle time and is useful only within a limited application range. Joining technologies such as binding or gluing using adhesives suffer from mismatch between the thermal expansion coefficients of transparent material and the adhesive and the long term stability of the bonds. Oxygen and moisture gradually penetrate the interior of the component and affect its function. The limited durability and the temperature sensitivity of glued connections are problems, especially for components used in the medical sector. The most common bonding technique for glass is optical contacting and this is an adhesive-free process at which two ultra flat and ultraclean surfaces with the same curvature are bound together by the molecular attraction between the surface atoms. But the bond strength is typically very weak (a few kPa) and is highly susceptible to impact load. Another technique, laser welding using Continuous Wave (CW) lasers or long pulsed lasers is based on linear absorption—the laser beam penetrates the top sample and is focused on the top surface of the bottom sample. In this technique, cracks develop during the cooling period. Since this technique is based on linear absorption, it requires that one of the samples to be joined be transparent and the other sample to be absorbing at the wavelength of the laser used. Thus, the selection of materials to be joined is limited and it cannot be carried out for non-absorbing materials such as glasses. Furthermore, sealing and packaging of semiconductor material is very important and critical in producing highly reliable semiconductor devices. Traditional welding methods, such as arc welding and brazing, generate heat-affected zones (HAZ) and result in a reduction of the tensile strength and toughness of the materials. Residual stresses that develop as the materials cool down also reduce the strength of the welded joints. Thus, the welding process must be optimized (by optimizing heat generation, compositions, and cooling rates) and post-welding treatments are also often needed to relieve residual stresses and make the microstructure of the welds more uniform. Therefore, it would be useful to develop a simple and cost-effective method of welding and sealing optical transparent materials with high precision.

There has been some work on welding of optical transparent materials using ultra-short pulsed lasers, specifically by Itoh et al. (US2010/0047587) and Bovatsek et al. (US2010/0084384). But these systems only achieve good welding between substrates and components with small area and are thus limited in their use for industrial applications. They have demonstrated welding with bonded area of less than 0.2 $mm^2$ for similar and dissimilar materials. They also require that the substrates have high precision flatness and that the gap between the substrates to be less than a quarter wavelength for successful welding. To achieve this, Itoh used a hemispherical projection to achieve only a small area of optical contact between substrates. This invention overcomes this limitation and demonstrates the capability to weld similar and dissimilar materials using ultra-short pulsed lasers over 10 $mm^2$ areas between the two substrates. This invention increases the potential for laser welding of applications in semiconductor industry, precision optic manufacturing, and aerospace engineering using USP lasers.

The embodiment or embodiments described herein may solve these shortcomings as well as others by proposing a simple and cost-effective method of welding and sealing optical transparent materials over a large area with high precision. Additionally, the embodiments may be used for three dimensional large area welding.

The term "ultra-short pulse laser" or "USP laser" refers to a laser beam generated in the form of extremely brief and finite intervals, i.e., pulses. USP lasers used herein are characterized by various parameters. For instance, "pulse duration" refers to the length of time of each interval wherein the laser beam is generated. A suitable pulse duration may be between about 1 fs to about 50 ps. The parameter "pulse energy" refers to the amount of energy concentrated in each interval wherein the laser beam is generated. Pulse energy may be between about 0.01 µJ to about 100 mJ. The single pulse fluence refers to the pulse energy delivered over the focal spot size. It may be between 0.01 $J/cm^2$ to 100 $J/cm^2$. The parameter "repetition rate" refers to the number of pulses that are emitted per second, and indirectly relates to the time between each pulse emission, i.e., the length of time between each pulse. The repetition rate may be between about 1 kHz and about 100 MHz. The USP laser beam of the invention may be of any wavelength in the electromagnetic spectrum from deep UV to IR range. The wavelength may be between about 100 nm to about 10 µm. Another parameter used to characterize the USP laser is "scanning speed," which refers to the rate at which the USP laser moves across the surface of a material. The scanning speed may be, for example, between about 0.01 mm/s and about 500 mm/s. The numerical aperture used for focusing of the USP laser beam may be between 0.05 to 0.9. The "focus spot size" refers to the diameter of the USP laser beam. This diameter may be, for example, between about 400 nm and about 100 µm.

The methods of the invention described herein take advantage of the unique effects of USP lasers. When USP laser pulses are tightly focused onto optically transparent materials, the high intensity inside the focal volume due to the tight focusing of the short laser pulse will induce multi-photon or tunneling ionization and subsequent avalanche ionization occurs, and finally this nonlinear absorption results in the creation of hot plasma and subsequent heating to the surrounding materials. Therefore, the USP laser can act as a local heat source in the volume. Because the plasma generation happens within a small focal region and the cooling time is short, high repetition rate laser systems operating in the MHz range are generally used, which leads to the melting of the focal region due to heat accumulation of successive pulses.

The melting and solidification of the material results in the generation of covalent bonds if the laser focus is located at the interface between two adjacent samples. Furthermore, the highly localized heat generation minimizes the thermal induced stress and can effectively suppress the development of the thermally induced cracks.

Through nonlinear absorption, USP lasers can deposit energy into an extremely well-defined region within a bulk transparent material, and produce a range of features—causing a permanent refractive index change that enable optical waveguiding, melting, and subsequent welding for two or more stackable materials, or voids that can be used for microfluidic fabrication. The property of USP lasers of the invention to process optically transparent material without transferring energy and damaging surrounding material is ideal for precision methods such as bonding, micro-channel fabrication, etc. The term "precision" relates to application of the USP laser without damaging material surrounding the target site.

Optically transparent is the physical property of allowing light to pass through a material. Transparent in the definition means that when a USP laser beam is incident on the material, the substrate is transparent to the extent that a nonlinear absorption phenomenon occurs. Accordingly, whether the substrate to be welded is transparent with respect to visible light is not a concern. In other words, if a substrate material is determined to be opaque for visible light, such a substrate is still considered to be 'transparent' material in the definition of the present invention as long as USP laser beam can generate nonlinear absorption in the material after penetrating a certain depth of the material. The transparent material can be selected from the group consisting of all types of glasses, polymers, silicon, germanium, gallium, gallium arsenide, silicon carbide, arsenide, indium gallium arsenide and other alloy of multiple semiconductor compounds.

One particular aspect of the invention provides a method of welding optically transparent materials with high precision with a simple set up, comprising applying a USP laser beam to the interface between two stackable substrates. The beam may be initially focused at a first site in the interface, such that the beam generates welding at the site. The USP laser may then be applied to a second site above or adjacent a few microns to the first site, wherein the laser welds the materials at the second site. This process may be repeated for additional sites across the interface until the welding seam is strong enough to prevent separation. Here the weld is defined as a localized fusion of transparent materials produced by nonlinear absorption to suitable temperatures. Pressure may be applied to the two stacked substrates and no filler material is used or required.

A problem in the conventional laser welding method is that it is necessary to accurately form the focal point of the ultra-short pulse laser beam on the interface of the two substances that are to be joined, but knowing the position where the focal point of the laser beam is formed is extremely difficult since the substances to be joined are transparent to the laser beam. In contrast, when a USP laser beam having a pulse width on the order of a femtosecond to a picosecond is incident on a transparent substance such as glass, the laser beam has a basically Gaussian spatial intensity distribution. Therefore, the refractive index in the center portion where the light intensity is high in a nonlinear medium is higher than in other areas, and the medium itself acts as a positive lens. For this reason, a self-focusing effect occurs in which the incident light becomes focused to a point, and in a USP laser beam, the beam diameter is thought to become minimal after the USP laser beam has propagated a finite distance in the transparent substance. However, in actuality, photoionization occurs in the medium, plasma in which electrons and ions in the substance move freely is formed, and the refractive index of the medium decreases. When the tertiary nonlinear optical effect and the reduction in the refractive index due to plasma formation counterbalance each other, the USP laser beam propagates a predetermined distance while maintaining a certain beam diameter. This phenomenon is called filamentation, and the area where filamentation occurs is called a filament area. Destructive damage is thought to not readily occur in the filament area due to the plasma density being kept constant.

Another method to solve the focusing position determination problem is to use multi-line scanning with long focal depth (smaller numerical aperture) and to use multi-line scanning with the same objective lens but with the focus position step adjustment for each repeat. The multi-line scanning is capable of covering a larger focal depth with focal position step adjustment for each repeat. This is also practical for industrial applications since the scanning speed is high enough. The focal position step adjustment starts from a deeper focus and move towards the focusing lens for each step. The step adjustment value can be from 5 μm to 50 μm. The high repetition rate and the pulse overlap results in an accumulated thermal heating between the material modification created by the previous pulse and the subsequent pulses for the same focal position. This gives a fast welding speed and a relatively smooth welding region. The nonlinear absorption process effectively confines the absorbed energy near the welding interface and minimizes the damage and stress formation to the rest of the material, so fine welding lines or regions can be obtained with the USP laser.

Figure 1:
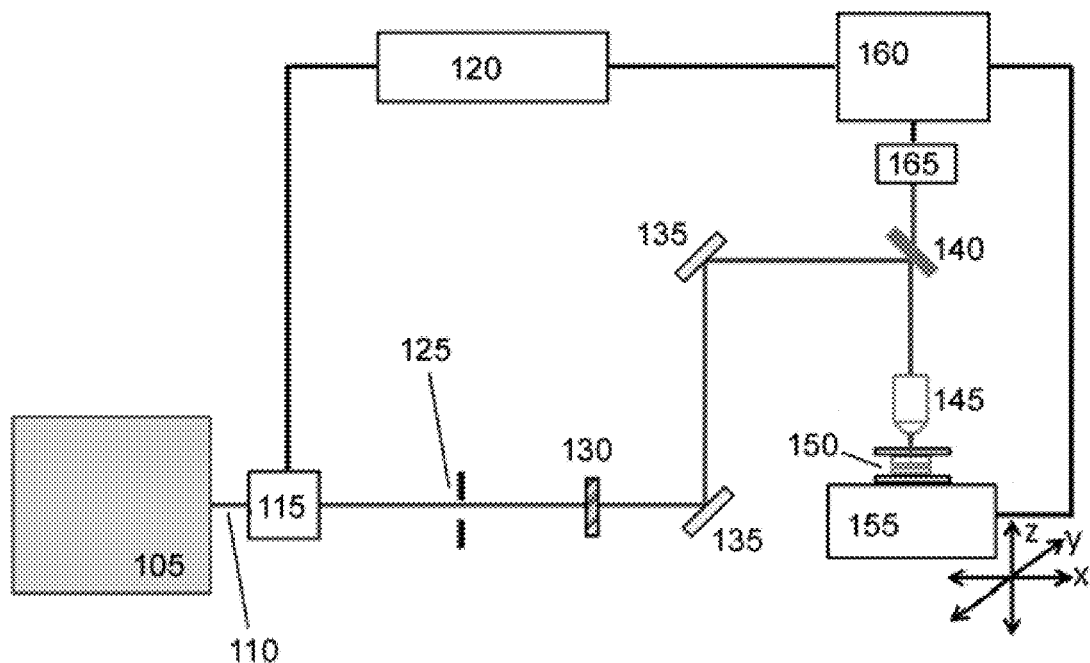
FIG. 1 is a schematic diagram of a set up for USP laser welding and sealing of optically transparent materials, in accordance with some embodiments.

FIG. 1 is a schematic diagram of a set up for USP laser welding and sealing of optically transparent materials, in accordance with some embodiments.

Figure 2:
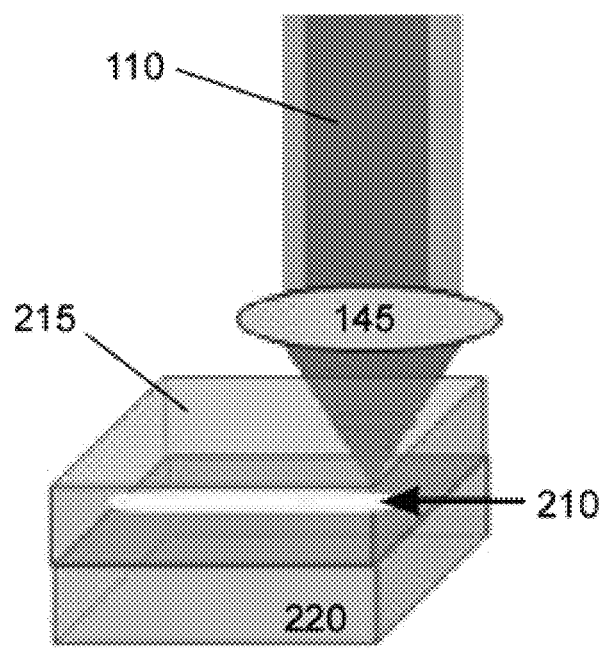
FIG. 2 is a schematic illustration of the USP laser welding and sealing of optically transparent materials by focusing the laser beam in the interface between the substrates, in accordance with some embodiments.

In some embodiments, a USP laser 105 emits laser pulses 110 which are directed through an Acoustic-Optic Modulator 115 which is controlled by a delay generator 120 to change the pulse repetition rate. The laser pulses 110 are then apertured with a shutter 125 before they pass through an attenuator 130 which controls the pulse energy. The laser pulses are then reflected by two mirrors 135 and one dichroic mirror 140 and subsequently focused by an objective lens 145. The laser pulses 110 are focused at the interface between the two substrates of the sample 150 and generate nonlinear absorption so that the two substrates are welded together by the generation of a filament area resulting from the self-focusing effect of the USP laser pulses in the top substrate. A mechanical fixture is used to hold the samples on a motorized 3-axis motion stage system 155 with two tilting adjustment for alignment. Depending whether clamping force is needed or not, the fixture also serves as a clamping device to generate close contact between two substrates when necessary. A computer 160 is used to control the delay generator 120 and to view and capture live images from the CCD 165 which monitors the sample through the dichroic mirror 140 as the sample is welded. FIG. 2 shows a close up of the weld region 210 that is generated. The USP laser pulses 110 are directed through the objective lens 145 and focused on the interface between the top substrate 215 and the bottom substrate 220.

Figure 3B:
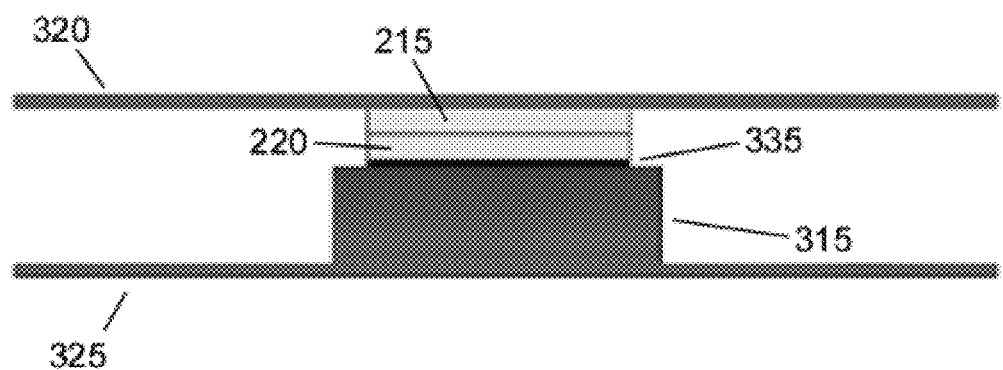

In some embodiments, a fixture is used to decrease the air space between the top substrate and the bottom substrate. FIG. 3(a) shows an isotropic view of one such fixture. Two transparent material substrates 310 are stacked together and a cylindrical lens 315 or some other object that creates a pressure region under the bottom plate is placed underneath the bottom substrate. A cylindrical lens, or portion of a cylinder, will create a linear pressure region whereas other objects like a torus would create a circular pressure region between the two substrates. Other shaped raised objects created from segments of cylinders and tori can be used to create any arbitrary shaped pressure regions. Segments of cylinder will create linear regions and segments of tori will create arc regions. A cushion or some other malleable material on top of the cylindrical lens 315 may be used to extend the pressure area and to keep the pressure uniform over the area. By using an extended pressure region, it is possible to weld longer lengths and subsequently larger total areas. The sample is pressed together between a top plate 320 and a bottom plate 325. The plates can be made of titanium or other rigid material. The plates are held together with screws and nuts (not shown) through the holes 330 in the top plate 320 and bottom plate 325 so that a close and uniform interface line is generated along the cylindrical axis direction. The gap between the two substrates is usually less than a quarter wavelength along the uniform interface line as can be observed as an optical interference pattern using the CCD. FIG. 3(b) shows a cross sectional view of the sample fixture. In some embodiments, a cushion 335 may be placed between the cylindrical lens 315 and the bottom of the bottom substrate 220. The cushion 335 or some other malleable material is used to extend the pressure area and to keep the pressure uniform over the area, meanwhile it can also prevent the over stressing or fracturing of the bottom substrate.

FIG. 4 is a schematic illustration of the focal position step adjustment for USP laser welding and sealing of optically transparent materials, in accordance with some embodiments.

In some embodiments, focus position is adjusted to solve the focusing position determination problem. The focal depth is first positioned through and into the bottom substrate 220 as represented in step 1. The focus is then adjusted away from the bottom substrate 220 by some step adjustment value, Δz, which may range from 5 μm to 50 μm. The step adjustment is repeated until the focal depth extends into the bottom portion of the top substrate 215 as represented in step 3. FIG. 4 shows this process in three steps, but any number of steps may be used to facilitate the welding of the two substrates.

FIG. 5 is a microscopic view of welded and non-welded regions of fused silica, in accordance with some embodiments.

In some embodiments, an array of linear welds may be done to weld a region together. In FIG. 5, the welded region 510 can be distinguished from the non-welded region 515 of a fused silica sample. The substrates in FIG. 5 are still welded together, whereas in FIGS. 6(a) and (b), the substrates have been separated to break apart the weld. In FIGS. 6(a) and (b), the substrates had dimensions of 10 mm×10 mm with a 0.5 mm thickness and were welded with single line welds using USP laser pulses with 750 fs pulse duration, 1030 nm wavelength, 1 MHz repetition rate, 0.61 μJ pulse energy, and 1 mm/s scanning speed. FIG. 6(a) shows the welding surface of the top substrate showing grooves—welding seam peeled off, and FIG. 6(b) shows the welding surface of the bottom substrate showing bumps—welding seam remains. The welding seam for each single line can be clearly seen and most of the welding seam remains on the bottom substrate since the bottom substrate is fixed and the top substrate is peeled off manually. The laser beam was focused using a 20× objective lens with a 0.4 numerical aperture. The focal spot size of the laser pulse was calculated to be 5 μm. FIG. 7 shows an enlarged SEM view of the top two weld seams from FIG. 6(b). The welded seams can be seen floating in the air of the surface of the substrate due to the manual peeling of the top substrate from the bottom substrate.

In some embodiments, any arbitrary shaped weld may be produced, such as a circle, a square, a rectangular, a hexagon, a triangle, etc. Furthermore, the technique may also be applied to seal any shape of transparent material shape as long as the substrates surface flatness and roughness are good enough to obtain an intimate contact so that the interface gap between two substrates is shorter than the filamentation length. This may be accomplished with the help of clamping pressure in some cases. For example, the substrate shape can be square, rectangular, circular, triangular, hexagonal, etc. Additionally, the bottom substrate does not have to be transparent, thus making it possible to weld a glass substrate atop a metal substrate or any other non-transparent substrate.

FIGS. 8(a) and (b) are SEMs of multi line weld regions of fused silica with a 0.61 μJ laser pulse at 1 mm/s after breaking the weld, where FIG. 8(a) shows the welding surface of the top substrate and FIG. 8(b) shows the welding surface of the bottom substrate, in accordance with some embodiments.

In some embodiments, multiple lines are welded close together to weld an entire region. FIGS. 8(a) and (b) show an SEM view of multi line welding regions of fused silica after breaking the weld. Both of the substrates have dimensions of 10 mm×10 mm with a 0.5 mm thickness. The USP laser pulses had a 750 fs pulse duration, a 1030 nm wavelength and a 1 MHz repetition rate. The pulse energy used was 0.61 μJ and the scanning speed was 1 mm/s. FIGS. 8(a) and (b) illustrate the two surfaces of the same welding position. FIG. 8(a) shows the welding surface of the top substrate after separation and FIG. 8(b) shows the welding surface of the bottom substrate after separation. In total, there are 40 lines which were repeated three times for each line. The pitch between the lines is 5 μm which resulted in a total welding area size of 0.1 $mm^2$. The protrusion 810 corresponds to the recess 815 and the protrusion 820 corresponds to the recess 825. There is a one-to-one correspondence between the protrusions or bumps and the recesses or indentions of the substrates which shows the effective welding of the two substrates.

FIG. 9 shows two multi line weld regions in a sample, in accordance with some embodiments.

In some embodiments, one-edge sealing of transparent material is accomplished by using a USP laser. FIG. 9 is a picture showing two regions of area scanning. The substrates have dimensions of 10 mm×10 mm×1 mm. Where the substrates have been effectively sealed together, there are no visible interference fringes. The sample shows that it was completely along the entire length. The weld comprises two area sections of 500 μm×10 mm. The top area 910 was scanned with 0.86 μJ pulses and repeated once with 0.62 μJ pulses at a 10 μm focal position change. The top area 910 comprises about 100 lines with a 5 μm pitch scanned at 1 mm/s for a total area of 5 $mm^2$. The lower area 915 was scanned with 0.62 μJ pulses at 1 mm/s followed by different repeat scans. The first 250 μm closest to the top area 910 were repeat scanned 3 times with a 10 μm focal position change. The next 125 μm were repeat scanned 2 times and the bottom 125 μm was not repeat scanned. The total area scanned in the lower area 915 was also 5 $mm^2$.

FIGS. 10(a) and (b) show a one-edge-sealed glass substrate weld, where FIG. 10(a) shows the welded regions visible by LED side illumination and FIG. 10(b) shows the attachment of the bottom plate as exhibited by the top plate being held by tweezers, in accordance with some embodiments.

In some embodiments, one-edge sealing of glass substrates is accomplished by using a USP laser. FIG. 10(a) clearly shows two sealed regions that run from edge to edge. They are visible as the two bands 1010 and 1015 resulting from LED side illumination. FIG. 10(b) shows that if only the top glass substrate is held with a pair of tweezers, the force of gravity does not separate the two glass substrates as they have been effectively welded.

FIGS. 11(a) and (b) show a four-edge-sealed fused silica weld, where FIG. 11(a) shows the top view with interference fringes visible for those non-welded regions and no interference fringes visible for those sealed seams and FIG. 11(b) shows the four welded seams crossing each other visible by LED backlight illumination, in accordance with some embodiments.

In some embodiments, all four edges of the sample may be welded from edge to edge to seal two glass slides. The USP laser pulses are initially focused in the interface along one edge of the substrate such that the USP laser pulses generate one continuous weld seam along one edge. The USP laser pulses may then be applied to a second edge adjacent to the first welded edge to generate a second weld seam. This process may be repeated along the four edges of the transparent material substrate. FIG. 11(a) is a photo of two 10 mm×10 mm×1 mm silica samples that were welded from edge to edge on all four sides with USP laser pulses having 750 fs pulse duration, 1030 nm wavelength, 1 MHz repetition rate, 0.61 µJ pulse energy, and 1 mm/s scanning speed. Each edge comprises a weld area of 2.5 mm$^2$ for a total weld area for the sample of 10 mm$^2$. FIG. 11(a) shows the top view with interference fringes seen with reflection for those non-welded regions and no interference fringes seen for the sealed seams. FIG. 11(b) shows a transmission view of the four welded and sealed seams, 1110, 1115, 1120, and 1125 crossing each other visible by LED backlight illumination. Each seam was welded with three repeat scans. Generally if the first welding seam is effective, the rest of the seams will be effective since optical contact can be obtained easily. FIG. 12(a) shows a microscopic view of one of the edges from the sample in FIGS. 11(a) and (b) and FIG. 12(b) shows a microscopic view of two crossed sealed edges. The images show that the welds are effective in sealing the two substrates together. To further show the hermetic sealing of the two substrates, the sample was immersed in water to see whether water would penetrate the sealed region. FIG. 13 shows that water did not penetrate into the central region of the sample due to the surrounding four weld seams. The purpose of the sealing may not only be to contain a liquid, but can also be used to seal against a gas. Additionally, the bottom surface of the top glass slide or the top surface of the bottom slide may have some coating that is protected by the welding of a hermetically sealed region. The coating can be on one or both of the slides. The slides can comprise any optically transparent substrate or filter that has a coating that needs to be protected from the environment. This embodiment of the invention enables the sealing of filters with coatings for a variety of industrial applications.

In some embodiments, the scan speed may be adjusted to achieve the desired effective weld. FIG. 14 shows a microscopic view of USP laser fused silica single line welds with a pulse energy of 0.95 µJ but with different scanning speeds. Weld 1410 was scanned at 0.1 mm/s, weld 1415 was scanned at 0.2 mm/s, weld 1420 was scanned at 0.5 mm/s, weld 1425 was scanned at 1.0 mm/s, and weld 1430 was scanned at 2.0 mm/s. Interference fringes can be seen between the welds. Although the weld line width becomes smaller for larger scanning speeds, the welding seam is uniform even for 10 mm/s. The welding seam width and strength can be compensated by using higher pulse energy or higher repetition rates. High speed welding and sealing up to 500 mm/s makes the welding technique applicable for industrial production. FIG. 15 shows the microscopic view of one of the substrates from the sample of FIG. 14 after the sample has been manually separated. The welding seams 1410, 1415, 1420, 1425, and 1430 are clearly visible.

In some embodiments, more than two substrates can be stacked and welded onto each other. To seal a three-layer transparent material substrate, the bottom two substrates are first sealed by focusing the USP laser pulses between the interface between the bottom two substrates. After the bottom two substrates are sealed, a third substrate may be sealed onto the sealed two substrates. Generally, the sealing sequence for multi-layer sealing is from bottom to top so that the USP laser pulses do not need to be focused too deep, thus lessening the laser beam loss and distortion.

FIG. 16 is a block diagram illustrating a method for three dimensional large area welding and sealing of optically transparent materials with ultra-short pulsed laser, in accordance with some embodiments.

Processing begins at block 1605 where an ultra-short pulsed laser is used to generate a beam of ultra-short pulses. At block 1610, the beam is directed to an acoustic-optic modulator to control the repetition rate of the beam. After passing through the acoustic-optic modulation, at block 1615, the beam is directed to an attenuator to control the energy of the beam. After passing through the attenuator, at block 1620, the beam is directed to a focusing lens to focus the beam between a top substrate and a bottom substrate in order to weld the top substrate to the bottom substrate. Finally, at block 1625, a three-axis stage is used to control the position of the top substrate and the bottom substrate relative to the beam in order to weld the top substrate to the bottom substrate at different points. At block 1630, additional substrates can be welded and sealed by the recurrence of the process in blocks 1620 and 1625 to create three dimensional large area welds and seals of optically transparent materials.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. An apparatus for sealing and welding optically transparent substrates comprising:
    an ultra-short pulse laser to produce a beam of ultra-short laser pulses, wherein the beam comprises a pulse duration, a wavelength, a repetition rate, and a pulse energy;
    an acoustic-optic-modulator at the output of the ultra-short pulse laser to control the repetition rate of the beam;
    an attenuator to control the pulse energy of the beam after passing through the acoustic modulator;
    a focusing lens to focus the beam between a top substrate and a bottom substrate, wherein the top substrate and the bottom substrate are substantially in contact; and
    a three-axis stage to control the position of the top substrate and the bottom substrate relative to the beam;
    wherein the top substrate and the bottom substrate are held together in a fixture comprising a top plate atop the top substrate, a bottom plate below the bottom substrate, and a protrusion between the bottom substrate and the bottom plate;
    wherein the top plate and the bottom plate are mechanically coupled together to press the top substrate and the bottom substrate together; and
    wherein the protrusion comprises segments of a cylinder or a torus.

2. The apparatus of claim 1, wherein the bottom plate comprises the protrusion.

3. The apparatus of claim 1, wherein the fixture further comprises a cushion between the bottom substrate and the protrusion.

4. The apparatus of claim 1, wherein the pulse duration is in the range between approximately 1 fs to 50 ps, wherein the wavelength is in the range between approximately 100 nm to 10 μm, wherein the repetition rate is in the range between approximately 1 kHz to 100 MHz, wherein the energy is in the range between approximately 0.01 pJ to 100 mJ, and wherein the beam is scanned over the top substrate between approximately 0.01 mm/s to 500 mm/s.

5. The apparatus of claim 1, wherein the top substrate and the bottom substrate exhibit nonlinear absorption of the beam.

6. The apparatus of claim 1, wherein the top substrate is any of glass, polymer, silicon, germanium, gallium, gallium arsenide, silicon carbide, arsenide, indium gallium arsenide, and an alloy including at least one of these.

7. The apparatus of claim 1, wherein the bottom substrate is any of glass, metal, polymer, silicon, germanium, gallium, gallium arsenide, silicon carbide, arsenide, indium gallium arsenide, and an alloy including at least one of these.

8. The apparatus of claim 1, wherein the top substrate and the bottom substrate are composed of the same material.

9. The apparatus of claim 1, wherein the top substrate and the bottom substrate are composed of different materials.

* * * * *